United States Patent
Mendoza et al.

(10) Patent No.: US 11,422,682 B2
(45) Date of Patent: Aug. 23, 2022

(54) REAL-TIME DISTRIBUTED USER INTERFACE UPDATES

(71) Applicant: NCR Corporation, Atlanta, GA (US)

(72) Inventors: Joseph Jover Piñon Mendoza, Cebu (PH); Ferdinand Salarda Acedera, Cebu (PH); Clem Paradero Pepito, Cebu (PH)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/261,833

(22) Filed: Jan. 30, 2019

(65) Prior Publication Data

US 2020/0241717 A1    Jul. 30, 2020

(51) Int. Cl.
  *G06F 3/0484* (2022.01)

(52) U.S. Cl.
  CPC ................... *G06F 3/0484* (2013.01)

(58) Field of Classification Search
  CPC .. G06F 3/0484; G06F 2209/545; G06F 9/542; G06F 9/451; H04L 67/26; H04L 67/14; H04L 67/306; H04L 67/22
  See application file for complete search history.

(56) References Cited

U.S. PATENT DOCUMENTS

| | | | | |
|---|---|---|---|---|
| 2009/0085871 A1* | 4/2009 | Bhogal | ................. | G06F 3/0488 345/163 |
| 2011/0004888 A1* | 1/2011 | Srinivasan | .............. | G06F 9/452 719/329 |
| 2012/0092277 A1* | 4/2012 | Momchilov | ............ | G06F 3/041 345/173 |
| 2013/0246936 A1* | 9/2013 | Nancke-Krogh | ..... | G06F 9/4843 715/750 |
| 2015/0149404 A1* | 5/2015 | Lock | ..................... | G06F 16/176 707/608 |
| 2016/0373531 A1* | 12/2016 | Yin | ..................... | H04L 12/1822 |
| 2016/0378737 A1* | 12/2016 | Keslin | .................... | G06F 40/18 715/753 |
| 2017/0257405 A1* | 9/2017 | Lo | ....................... | G06F 3/04812 |

OTHER PUBLICATIONS

Session from the Free Online Dictionary of Computing. (article) [online]. FOLDOC.com. Archived Aug. 17, 2009. Retreived on Dec. 9, 2020. https://foldoc.org/sessions (Year: 2009).*

* cited by examiner

*Primary Examiner* — John T Repsher, III
(74) *Attorney, Agent, or Firm* — Schwegman, Lundberg & Woessner

(57) ABSTRACT

A distributed interface is provided with real-time updates. A first user accessing the interface through a first user window is dynamically updated within the first user window and in real time when a second user accessing the interface through a second user window changes a field/character within the second user window. In an embodiment, the updated notification is achieved without window refreshing and without a committed update for the field/character change being committed by the second user to a back end system associated with the distributed interface.

15 Claims, 7 Drawing Sheets

REAL-TIME DISTRIBUTED USER INTERFACE UPDATES

BACKGROUND

Enterprises often have a variety of systems available for employees to perform daily tasks. Some tasks are more critical than other tasks, but generally all tasks can be completed through user interfaces directed to the systems.

Often multiple employees are assigned to perform a same task or a portion of an overall task while different employees perform other portions of the overall task.

Accordingly, it is not uncommon, for two windows associated with a same interface to be opened for updating by two different employees. The two individuals may be changing a same or different field within their corresponding window of the interface.

However, traditional interfaces will only recognize changes and save changes once a user selects an update option, exits the window, or saves the changes; until a user takes such an operation, the information being changed is only temporarily stored in cache. So, the users may have conflicting changes. The backend database will only retain the changes made after a save or a commit, such that one user will end up with changes that may not be reflected in the database or end up with multiple changes to a same field occur in succession (with the first saved and then the second saved based on who had the lock on the database). In some instances, the database may generate an error depending upon the timing of updates made.

Although databases have mechanism for handling conflicting updates to data for purposes of ensuring the integrity of the data, most task-critical interfaces do not allow two concurrent users. This is not practical for the users who may, for efficiency reasons, each be performing a portion of an overall task. Waiting to gain access to a task-critical interface until another user completes his/her tasks is inefficient and a waste of valuable resources.

SUMMARY

In various embodiments, methods and a system for real-time distributed user interface updates are presented.

According to an embodiment, a method for real-time distributed user interface updates is presented. Specifically, and in one embodiment, two separate executing instances of a window associated with an interface are identified as a first window instance and a second window instance. Information identifying changes made to the second window instance are updated in real time within the first window instance as the changes are inserted into input fields of the second window instance.

DETAILED DESCRIPTION

Figure 1A:
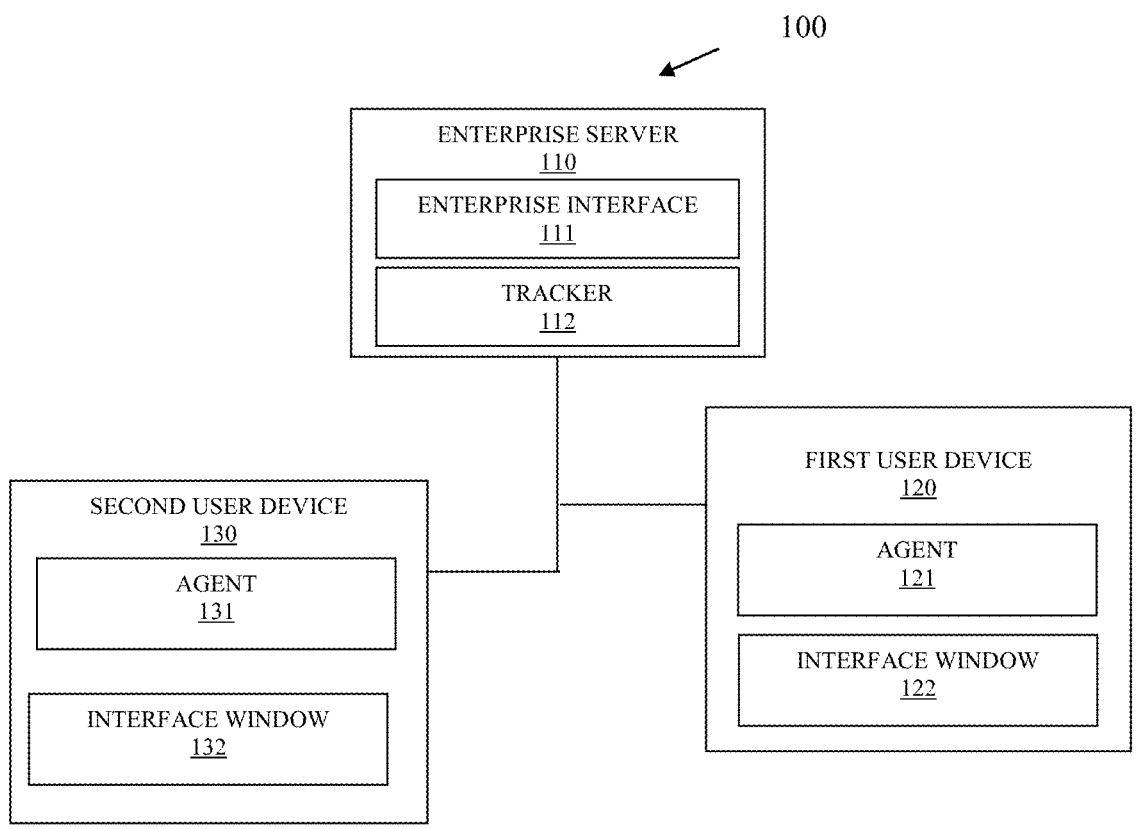
FIG. 1A is a diagram of a system for real-time distributed user interface updates, according to an example embodiment.

FIG. 1 is a diagram of a system 100 for real-time distributed user interface updates, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of real-time distributed user interface updates presented herein and below.

The system 100 includes an enterprise server 110 having an enterprise interface 111 to an enterprise service and a tracker. The system 100 further includes a first user device 120 having an agent 121 and an active instance of an interface window 122 to the interface 111. Moreover, the system 100 includes a second user device 130 having an agent 131 and an active instance of an interface window 132 to the interface.

The components 111, 112, 121, 122, 131, and 132 are provided as executable instructions that reside in non-transitory computer-readable storage mediums and are executed from those mediums by hardware processors on their respective devices 110, 120, and 130.

As discussed above, access to existing interfaces of enterprises do not permit concurrent user sessions for task-critical tasks. Such situation is remedied by the teachings provided herein for real-time distributed user interface updates.

As used herein, an "interface screen" is text, video, images, graphics, and/or audio information that is arranged to fit on a display of a device as rendered visual information within a window. The interface screens may be interactive and include selectable fields, menus, and/or input fields that can be selected or can have data inputted by the user. Selection of a selectable field may result in rendering new interface screen. The phrase "interface screen" may be used synonymously and interchangeably with the term "window."

As used herein, the term "user" and "operator" may be used synonymously and interchangeably with one another.

When a user signs into or authenticates to an enterprise service of the enterprise server 110 a session is created for the user with the service and the user is rendered one or more interface windows for interaction with the service through the enterprise service 111.

When a session is initiated for the users, an agent 121 and 131 is activated on the user devices 120 and 130. The agent 131 and 121 monitors input keystrokes and input device clicks/selections made by the user during the user's session with the service. The tracker 112 identifies each session and each instance of the interface windows 122 and 132, such that the tracker can determine when multiple devices 120 and 130 have different session instances of a same interface window 122 and 132.

When the tracker identifies a first user device 120 associated with a first instance of the interface window 122 and a second user device 130 associated with a second instance of the interface window 132, the tracker 112 instructs the agents 121 and 131 to monitor keystrokes within the instances of the windows 122 and 132 and report keystrokes to the other agent 121 or 131. This can also be achieved through the tracker 112 with the agents 131 and 121 reporting each keystroke directly to the tracker 112 and the tracker 112 notifying the other agent 121 or 132.

In an embodiment, only predefined fields associated with the instances of the windows 122 and 132 are tracked. A mapping of fields being tracked maintained by the tracker 112 and/or configured in the agents 121 and 131.

In an embodiment, the agents 121 and 131 not activated until the instance of the window 122 or 132 is placed in a state that would permit changes (for example, the window may be in a read only mode of operation within the context of the interface 111).

As an agent 121 or 131 receives a notification that keystrokes were made to fields of the interface window 122 and 132 from either the tracker or the other agent 121 or 131, the receiving agent 121 or 131 displays the changes noted in real time within that agent's instance of the interface window 122 or 132. The changed fields can also be highlighted or distinguished in some visible manner within the instance of the interface window 122 or 132.

Figure 1B:
FIG. 1B is an example window for a first user of a real-time distributed interface, according to an example embodiment.
Figure 1C:
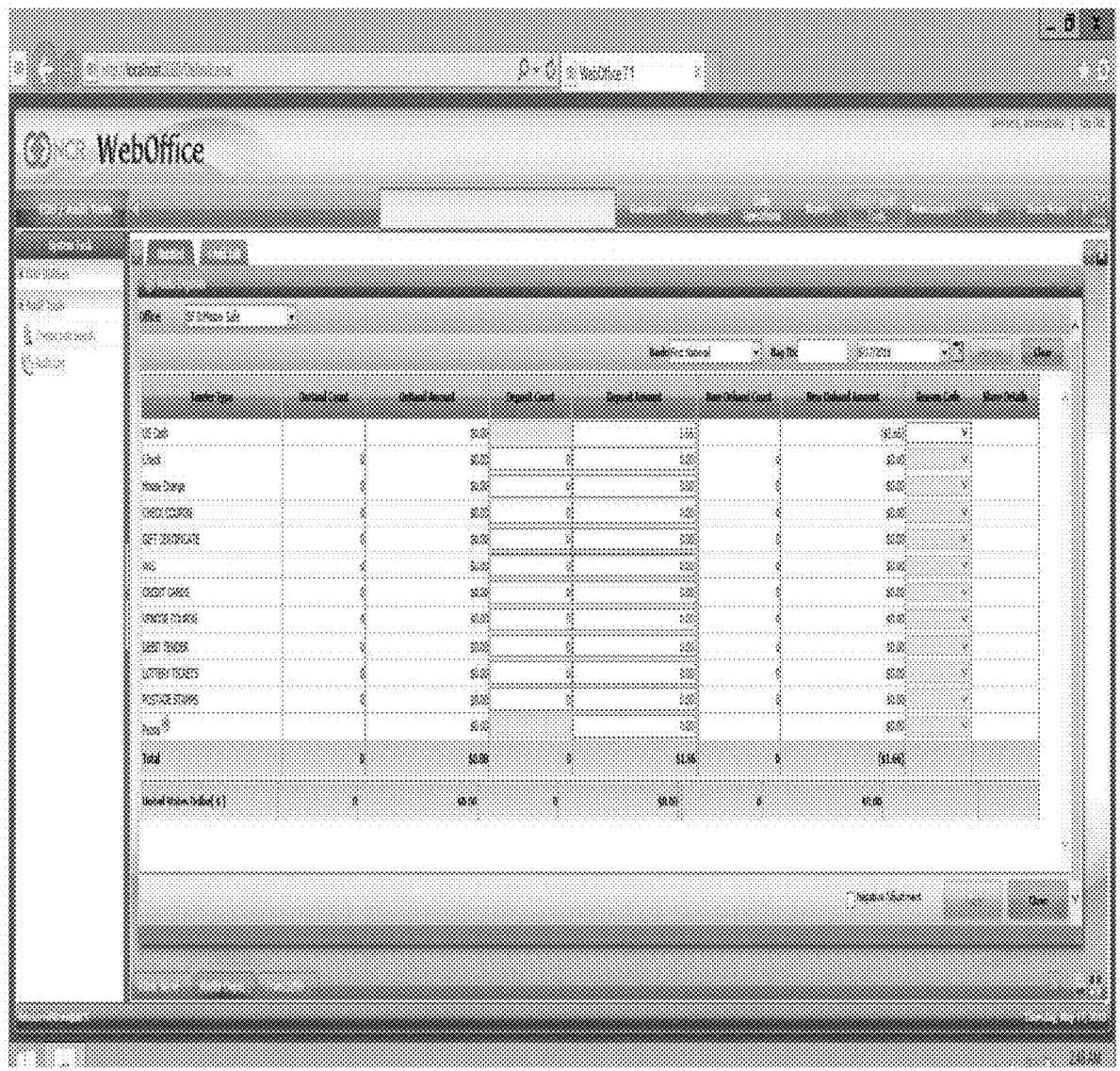
FIG. 1C is another example window for a second user of the real-time distributed interface, according to an example embodiment.
Figure 1D:
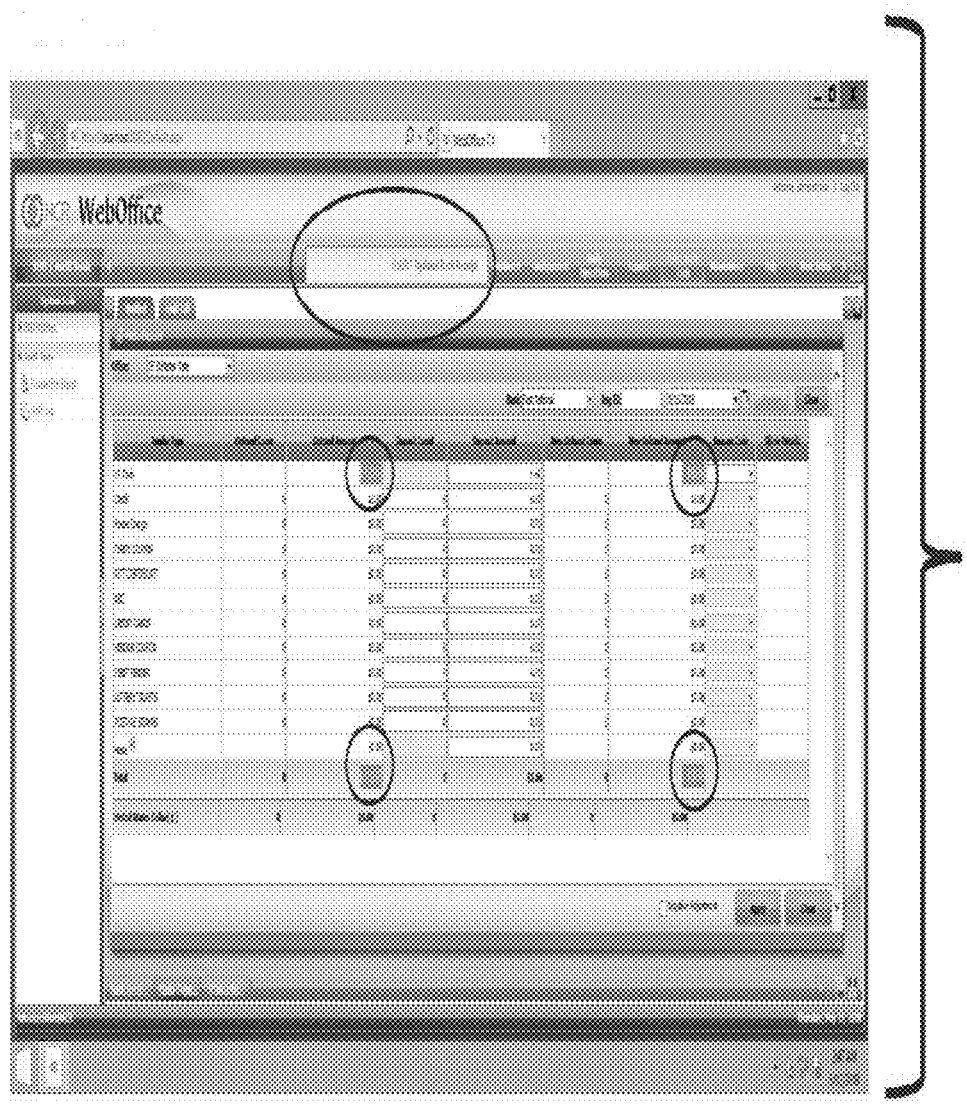
FIG. 1D is still another example updated window for the second user with real-time updated information regarding updates made by the first user, according to an example embodiment.

For example, the FIG. 1B shows an example instance of interface window 122 for a first user operating a first device 120. The FIG. 1B shows an example instance of interface window 132 for a second user operating a second device 130. Both users are concurrently accessing the enterprise interface 111 over a network connection and a same screen of information at a same time. Now assume that first user makes a change within the first instance of the interface window 122 to reflect a task being completed by the first user (such as to perform a $100 bank receipt task), while at the same time the second user makes a change within the second instance of the interface window 132 (as shown in the FIG. 1C) to perform a different task or similar task (such as to perform a $1.6 million media deposit). Once the first user enters keystrokes into the appropriate field of the first instance of the window 122 agent 121 reports to agent 131, and agent 131 updates in real time a status field (top circle in the FIG. 1D) within the second instance of the window 132 on the second device 130.

This real-time updated information is provided without the first user performing any action such as (hitting return, clicking commit/save). The real-time updated information is dynamic and occurs as soon as the first user begins to enter any information into a field of the first instance of the window 122 and is displayed to the second user within the second instance of the window 132. The name of the field changed can be provided in the status area (large circle made in the FIG. 1D to illustrate the real-time notification) along with the actual key entries. In fact, as the first user makes key entries the key entries are reflected in the fields of the second user's instance of the window 132, these changes can be seen in real time by the second user and can be highlighted or have an effect, such as blinking to alert the second user of the first user's changes. If the changes do not conflict with one another, the second user may choose to continue with the task being completed and be assured that no conflicts are going to result. If the changes are dependent on one another, duplicative, or otherwise cause a conflict, the second user may choose to wait, call the first user, text the first user, email the first user, etc.

It is to be noted that the changes are dynamic and reflected in all concurrent instances of the windows 122 and 132. That, is there can be more than 2 concurrent users. Notification occurs on key entry or input device selection entry.

In an embodiment, the user devices 120 and 130 may include one or more of: Self-Service Terminals (SSTs), Point-Of-Sale (POS) terminals, Automated Teller Machines (ATMs), kiosks, phones, tablets, wearable processing devices, desktop computers, and Internet-of-Things (IoT) devices. Any device for which access to the interface 111 is available can include an agent (121 or 131).

In an embodiment, the system 100 does not include a tracker 112; rather, the agents 121 and 131 communicate in real time to notify one another of their presence and the window instance 122 and 132. This can be done by the agents 121 and 131 utilizing a common storage area on the server 110, where the agents identify themselves, identify their session identifiers, identify their devices, and identify an active window identifier within the interface 111. An agent starting up can check the common storage area and provide the real-time updates. In this way, the system 100 can be processed without a tracker 112.

In an embodiment, the users share a same account with the enterprise service provided through the interface 111. That is, a same user with the same credentials to the service can be logged on and access the service concurrently.

These and other embodiments are now discussed with reference to the FIGS. 2-4.

Figure 2:
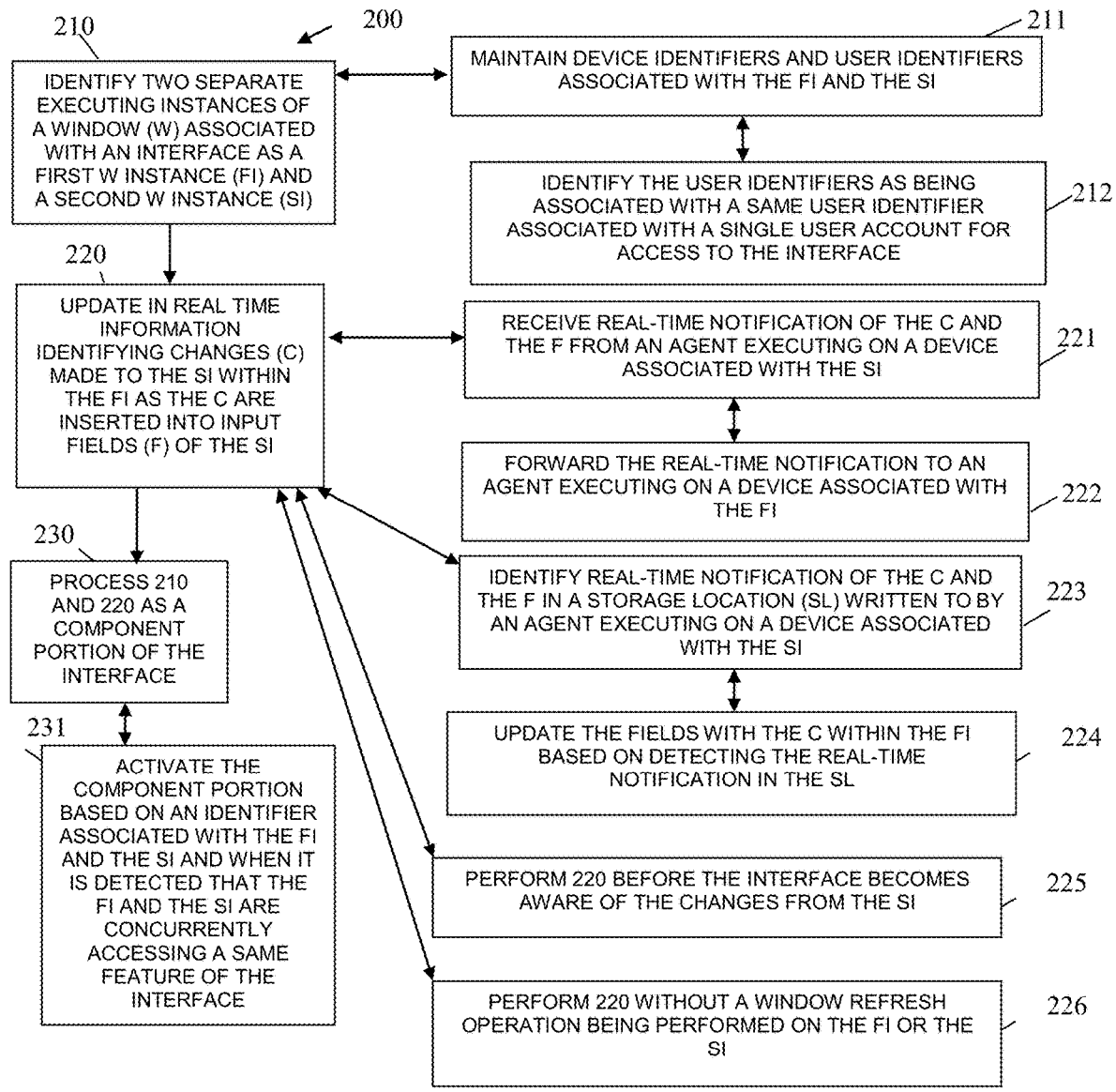
FIG. 2 is a diagram of a method for real-time distributed user interface updates, according to an example embodiment.

FIG. 2 is a diagram of a method 200 for real-time distributed user interface updates, according to an example embodiment. The software module(s) that implements the method 200 is referred to as a "real-time interface updater." The real-time interface updater is implemented as executable instructions programmed and residing within memory and/or a non-transitory computer-readable (processor-readable) storage medium and executed by one or more processors of a device. The processor(s) of the device that executes the real-time interface updater are specifically configured and programmed to process the real-time interface updater. The real-time interface updater has access to one or more network connections during its processing. The network connections can be wired, wireless, or a combination of wired and wireless.

In an embodiment, the device that executes the real-time interface updater is the enterprise server 110.

In an embodiment, the device that executes the real-time interface updater is one of the user devices 120 or 130. In an embodiment, the user device 120 or 130 is one of: a phone, a laptop, a desktop, a SST, a POS terminal, an ATM, a kiosk, and an IoTs device.

In an embodiment, the real-time interface updater is all or some combination of the enterprise interface 111, the tracker, the agent 121, and/or the agent 131.

At 210, the real-time interface updater identify two separate concurrently executing instances of a window associated with an interface as a first window instance and a second window instance.

In an embodiment, at 211, the real-time interface updater maintains device identifiers and user identifiers associated with the first window instance and the second window instance.

In an embodiment of 211 and at 212, the real-time interface updater identifies the user identifiers as being associated with a same user identifier associated with a same user account for access to the interface.

At 220, the real-time interface updater updates, in real time and dynamically, information identifying changes made to the second window instance within the first window instance as the changes are inserted into input fields of the second window instance.

In an embodiment, at 221, the real-time interface updater receives real-time notification of the changes and the fields from an agent executing on a device associated with the second window instance.

In an embodiment of 221 and at 222, the real-time interface updater forwards the real-time notification to a different agent executing on a device associated with the first window instance.

In an embodiment, at 223, the real-time interface updater identifies real-time notification of the changes and the fields in a storage location written to by an agent executing on a device associated with the second window instance. This embodiment was discussed above and can be achieved through agents 121 and 131 without the tracker 112.

In an embodiment of 223 and at 224, the real-time interface updater updates the fields with the changes within the first window instance based on detecting the real-time notification in the storage location.

In an embodiment, at 225, the real-time interface updater performs the update at 220 before the interface becomes aware of the changes from the second window instance. The changes are updated in the first window instance before any commit or save operation was issued within the second window instance.

In an embodiment, at 226, the real-time interface updater performs the update at 220 without any window refresh operation being performed on the first window instance or the second window instance.

In an embodiment, at 230, the real-time interface updater is processed as a component portion of the interface, wherein the interface is a distributed interface.

In an embodiment of 230 and at 231, the real-time interface updater activates the component portion based on an identifier associated with the first window instance and the second window instance when it is detected that the first window instance and the second window instance are concurrently accessing a same feature of the interface.

Figure 3:
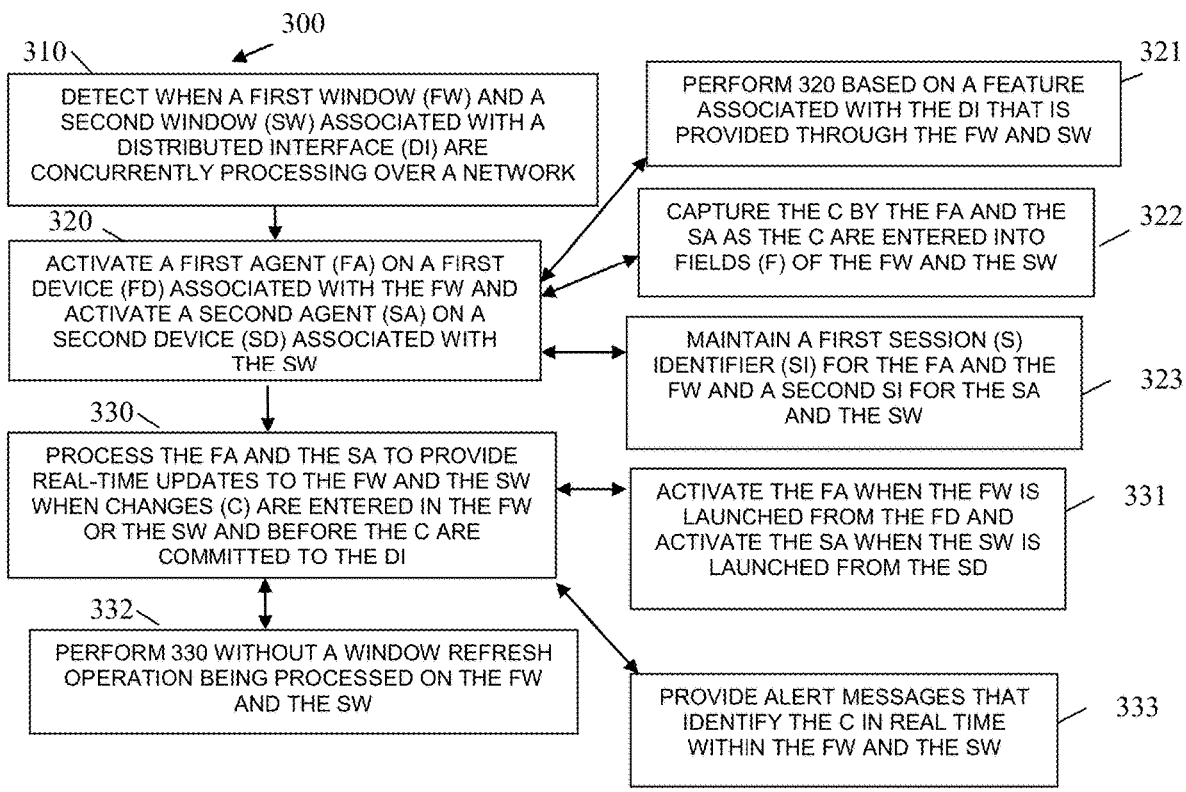
FIG. 3 is a diagram of another method for real-time distributed user interface updates, according to an example embodiment.

FIG. 3 is a diagram of another method 300 for real-time distributed user interface updates, according to an example embodiment. The software module(s) that implements the method 300 is referred to as a "distributed interface notifier." The distributed interface notifier is implemented as executable instructions programmed and residing within memory and/or a non-transitory computer-readable (processor-readable) storage medium and executed by one or more processors of a device. The processors that execute the distributed interface notifier are specifically configured and programmed to process the distributed interface notifier. The distributed interface notifier has access to one or more network connections during its processing. The network connections can be wired, wireless, or a combination of wired and wireless.

In an embodiment, the device that executes the distributed interface notifier is the enterprise server 110.

In an embodiment, the device that executes the distributed interface notifier is one of the user device 120 or 130. In an embodiment, the user device is one of: a phone, a tablet, a wearable processing device, a laptop, a desktop, a SST, a POS terminal, an ATM, a kiosk, and IoTs device.

In an embodiment, the distributed interface notifier is all of some combination of: the interface 111, the tracker 112, the agent 121, the agent 131, and/or the method 200.

In an embodiment, the distributed interface notifier presents another and in some ways enhanced processing perspective from that which was shown in the method 200 of the FIG. 2.

At 310, the distributed interface notifier detects when a first window and a second window associated with a distributed interface are concurrently processing over a network at a same time.

At 320, the distributed interface notifier activates a first agent on a first device associated with the first window and activates a second agent on a second device associated with the second window.

In an embodiment, at 321, the distributed interface notifier performs the activating at 320 based on a feature associated with the distributed interface that is being provided by the distributed interface through the first window and the second window.

In an embodiment, at 322, the distributed interface notifier captures the changes by the first agent and the second agent as the changes are entered into fields of the first window and the second window.

In an embodiment, at 323, the distributed interface notifier maintains a first session identifier for the first agent and the first window and maintains a second session identifier for the second agent and the second window.

At 330, the distributed interface notifier processes the first agent and the second agent to provide real-time updates to the first window and the second window with changes are entered into either one of the first window or the second window and before such changes are committed to the distributed interface.

In an embodiment, at 331, the distributed interface notifier activates the first agent when the first window is launched from the first device, and the distributed interface notifier activates the second agent when the second window is launched from the second device.

In an embodiment, at 332, the distributed interface notifier performs the processing at 330 without a window refresh operation being processed on the first window and the second window.

In an embodiment, at 333, the distributed interface notifier provides alert messages that identify the changes in real time within the first window and the second window. That is the changes are made in both windows and the window that did not make the changes receives a summary alert message in a status area of that window that identifies the changes. The alert message may also identify a user identifier and/or device identifier as well as identify the field that was changed and what it was changed to.

Figure 4:
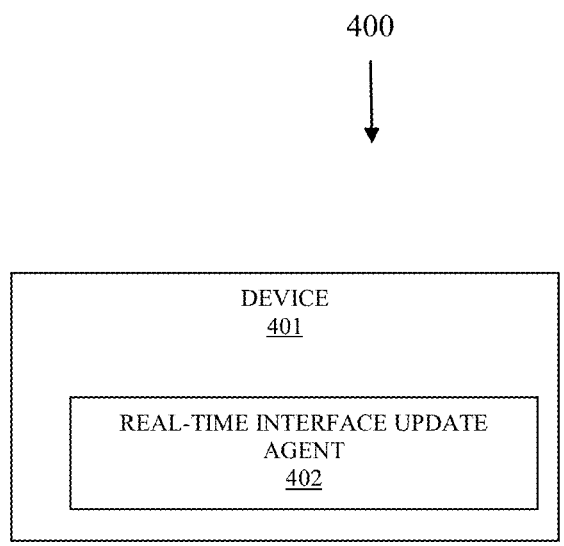
FIG. 4 is a diagram of a system for real-time distributed user interface updates, according to an example embodiment.

FIG. 4 is a diagram of a system 400 for real-time distributed user interface updates, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1A-1D and 2-3.

The system 400 is the system 100.

The system 400 includes a device 401 and a real-time interface update agent 402. The device 401 includes executable instructions residing in a non-transitory computer-readable storage medium of the device 401 representing the real-time interface update agent 402, which is executed by a hardware processor of the server device 401.

In an embodiment, the real-time interface update agent 402 is all or some combination of the tracker 112, the agent 121, the agent 131, the method 200, and/or the method 300.

In an embodiment, the device 401 is the enterprise server 100.

In an embodiment, the device 401 is one of the user device 120 or 130. In an embodiment, the device 401 is one of: a phone, a tablet, a laptop, a desktop, a wearable processing device, a SST, a POS terminal, an ATM, a kiosk, and an IoTs device.

The real-time interface update agent 402, when executed by the hardware processor of the device 401 from the non-transitory computer-readable storage medium, is configured to perform processing to: report a change to a field value provided in a window associated with a distributed interface when the change is inserted into a field of window; and update, in real time, the window, with a second change when the second change is detected as having been made in a different concurrent instance of the window processing over the network on a different device.

In an embodiment, the real-time interface update agent 402 is further configured to perform processing to: report the change and update the window with the second change without the change or the second change being committed to the distributed interface through the window or the different concurrent instance of the window.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   providing an interface from a server to user-operated devices;
   rendering instances of a window that provides access to the interface via the user-operated devices when the instances of the window are accessed by the user-operated devices;
   identifying, by the server, two separate executing instances of the window that provides access to the interface as a first window instance on a first user-operated device communicating in a first session with the interface from the server and a second window instance on a second user-operated device communicating in a second session with the interface from the server, wherein the first session is different from the second session, wherein the first window instance and the second window instance are in a read only mode;
   activating, by the server, a first agent on the first user-operated device and a second agent on the second user-operated device when at least one of the first window instance or the second window instance is placed in a state that permits changes to be made;
   monitoring predefined input fields within the first window instance and the second window instance for the changes, wherein only the predefined input fields are monitored for the changes and other input fields within the first window instance and the second window instance are not monitored for the changes; and
   updating, within the first window instance, in real time by the server, information identifying changes in the predefined input fields made in to the second window instance as the changes in the predefined input fields are made, wherein the updating is based on the first agent and the second agent managing a common storage area on the server, the second agent writing the changes in the predefined input fields to the common storage area, the server identifying in the common storage area, a real-time notification of the changes in the predefined input fields, and the server updating, based on detecting the real-time notification, the first window instance to include the changes in the predefined input fields.

2. The method of claim 1, wherein identifying further includes maintaining device identifiers for the corresponding user-operated devices associated with the first session and the second session and maintaining user identifiers for corresponding users associated with the first window instance and the second window instance.

3. The method of claim 2, wherein maintaining further includes identifying the user identifiers as being a same user identifier associated with a single user account for access to the interface and identifying the device identifiers as being different devices operated by the single user account.

4. The method of claim 1, wherein updating further includes performing the updating before the interface becomes aware of changes from the second window instance.

5. The method of claim 1, wherein updating further includes performing the updating without a window refresh operation being performed on the first window instance or the second window instance.

6. The method of claim 1 further comprising, processing, by the server, the identifying as a component portion of the interface.

7. The method of claim 6, wherein processing further includes activating the component portion based on an identifier associated with the first window instance and the second window instance and when it is detected that the first window instance and the second window instance are concurrently accessing a same feature of the interface.

8. A method, comprising:

providing a distributed interface from a server to user-operated device;

rendering instances of a window that provides access to the distributed interface via the user-operated devices when the instances of the window are accessed by the user-operated devices, wherein a first window of a first user-operated device and a second window of the second user-operated device are in a read only mode;

detecting, by the server, two separate executing instances of the window that provides access to the distributed interface when the first window and the second window are concurrently processing over a network with the first window being connected to the distributed interface over a first session and the second window being connected to the distributed interface over a second session, and wherein the first session is different from the second session;

activating, by the server, a first agent on the first user-operated device associated with the first window and activating a second agent on the second user-operated device associated with the second window, wherein activating further includes activating the first agent and the second agent when at least one of the first window or the second window is placed in a state that permits changes to be made;

managing, by the first agent and the second agent, a common storage area on the server;

monitoring predefined input fields within the first window and the second window for the changes, wherein only the predefined input fields are monitored for the changes and other input fields within the first window and the second window are not monitored for the changes; and processing the first agent on the first user-operated device and processing the second agent on the second user-operated device to provide real-time updates to the first window and the second window as the changes are entered in the predefined input fields for the first window or the second window based on the first agent or the second agent writing the changes in the predefined input fields to the common storage area, wherein the server identifies, in the common storage area, a real-time notification of the changes in the predefined input fields and the server updates, based on detecting the real-time notification, the first window or the second window instance to include the changes in the predefined input fields.

9. The method of claim 8, wherein activating further includes performing the activating based on a feature associated with the distributed interface that is provided through the first window and the second window.

10. The method of claim 8, wherein activating further includes capturing the changes by the first agent and the second agent as the changes are entered into the predefined input fields of the first window and the second window.

11. The method of claim 8, wherein activating further includes maintaining a first session identifier for the first agent associated with the first session and the first window and a second session identifier for the second agent associated with the second session and the second window.

12. The method of claim 8, wherein processing further includes performing the processing without a window refresh operating being processed on the first window and the second window.

13. The method of claim 8, wherein processing further includes providing alert messages that identify the changes in real time within the first window and the second window.

14. A system, comprising:

a server having at least one processor configured to execute instructions from a non-transitory computer-readable storage medium;

the executable instructions executed by the at least one processor from the non-transitory computer-readable storage medium causing the at least one processor to perform operations, comprising:

providing a distributed interface to user-operated devices;

rendering instances of a window that provides access to the distributed interface via the user-operated devices when the instances of the window are accessed by the user-operated devices;

identifying, by the server, separate executing instances of the window that provides access to the distributed interface as respective window instances on the user-operated devices communicating in respective different sessions with the distributed interface, wherein the respective window instances are in a read only mode;

activating, by the server, a respective agent on each of the user-operated devices when at least one of the respective window instances is placed in a state that permits changes to be made;

managing, by each respective agent on each of the user-operated devices, a common storage area on the server;

monitoring a given change to a field value provided in a particular rendered window of the respective window instances when the given change is inserted into a predefined input field of a plurality of predefined input fields for the particular rendered window, wherein the given change is written to the common storage area by a corresponding agent of a corresponding user-operated device associated with the particular rendered window, wherein only the predefined input fields are monitored for the changes and other input fields within the instances of the window are not monitored for the changes, wherein the state that permits the changes is detected within a particular session between the particular window and the distributed interface;

updating within remaining instances of the window, in real time by the server, the predefined input field with the given change as the given change is inserted into the predefined input field in the particular rendered window, wherein the updating is based on the server identifying, in the common storage area, a real-time notification of the given change, wherein the remaining instances of the window are updated by the server, based on detecting the real-time notification, to include the given change in the predefined input field, wherein a concurrent session exists between each of the remaining instances of the window and the distributed interface.

15. The system of claim 14, wherein the operations further comprise: updating the predefined input field with the given change in the remaining instances of the window without the given change being committed to the distributed interface through the particular rendered window.

\* \* \* \* \*